(12) United States Patent
Hemphill

(10) Patent No.: US 9,903,448 B2
(45) Date of Patent: Feb. 27, 2018

(54) ACCESSORY DEVICES DRIVE SYSTEM

(71) Applicant: Schaeffler Technologies AG & Co. KG, Herzogenaurach (DE)

(72) Inventor: Jeffrey Hemphill, Copley, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 135 days.

(21) Appl. No.: 15/189,640

(22) Filed: Jun. 22, 2016

(65) Prior Publication Data
US 2016/0305513 A1    Oct. 20, 2016

Related U.S. Application Data

(62) Division of application No. 14/049,532, filed on Oct. 9, 2013, now Pat. No. 9,447,726.

(60) Provisional application No. 61/805,356, filed on Mar. 26, 2013.

(51) Int. Cl.
| F02B 67/04 | (2006.01) |
| F16H 7/08 | (2006.01) |
| F02B 67/06 | (2006.01) |
| F02B 67/08 | (2006.01) |
| F16H 7/02 | (2006.01) |

(52) U.S. Cl.
CPC ........... *F16H 7/0827* (2013.01); *F02B 67/04* (2013.01); *F02B 67/06* (2013.01); *F02B 67/08* (2013.01); *F16H 7/02* (2013.01); *Y10T 74/19614* (2015.01)

(58) Field of Classification Search
CPC ........ F16H 7/0827; F02B 67/04; F02B 67/08; Y10T 74/19614; B60K 17/24
See application file for complete search history.

(56) References Cited

U.S. PATENT DOCUMENTS

| 4,145,888 A | 3/1979 | Roberts |
| 5,558,173 A | 9/1996 | Sherman |
| 5,700,212 A | 12/1997 | Meckstroth |
| 6,942,048 B2 | 9/2005 | Ishikawa et al. |
| 2008/0096711 A1 | 4/2008 | Smith et al. |
| 2009/0101465 A1 | 4/2009 | Hart et al. |
| 2014/0290406 A1* | 10/2014 | Hemphill ................. F02B 67/04 74/405 |
| 2015/0274167 A1* | 10/2015 | Hemphill .......... B60W 30/1886 477/5 |
| 2017/0190246 A1* | 7/2017 | Venturi .................. B60K 6/383 |

* cited by examiner

*Primary Examiner* — Faye M Fleming
(74) *Attorney, Agent, or Firm* — Simpson & Simpson, PLLC

(57) ABSTRACT

An accessories drive system, including: a clutch assembly with a drive shaft; and at least one accessory device connected to the drive shaft. In a first position for the clutch assembly: the clutch assembly is arranged to transmit a first torque from an output shaft for a transmission to the drive shaft to drive the at least one accessory device and rotation of the drive shaft is isolated from rotation of a launch device for the vehicle. In a second position for the clutch assembly: the clutch assembly is arranged to transmit a second torque from the launch device to the drive shaft to drive the at least one accessory device and the rotation of the drive shaft is isolated from rotation of the output shaft for the transmission.

6 Claims, 7 Drawing Sheets

ACCESSORY DEVICES DRIVE SYSTEM

CROSS-REFERENCES TO RELATED APPLICATIONS

This application is a divisional patent application filed under 35 U.S.C. §§ 120 and 121 based on U.S. patent application Ser. No. 14/049,532, filed Oct. 9, 2013, and claims the benefit under 35 U.S.C. § 119(e) of U.S. Provisional Patent Application No. 61/805,356, filed Mar. 26, 2013, which applications are incorporated herein by reference in their entireties.

TECHNICAL FIELD

The present disclosure relates to a system for driving accessory devices for a vehicle, in particular, a system driving the accessory devices using an output of a crankshaft, a transmission shaft, or an electric machine.

BACKGROUND

It is known to drive accessory devices for a vehicle, such as an alternator, water pump, or oil pump, using belts and pulleys driven by the crankshaft of the engine for the vehicle. Thus, the rotational speeds for the accessory devices have fixed ratios with respect to the rotational speed of the crankshaft. The accessory devices are normally sized to deliver full output at engine idle speed in order to allow full functionality at idle speed. As a result, during normal operation of the vehicle, when the crankshaft is rotating at speeds greater than the idle speed rotation, the accessory devices are being rotated much faster than required. Further, when the engine is turned off, the accessories come to a stop, which creates problems for stop-start and hybrid capable vehicles.

SUMMARY

According to aspects illustrated herein, there is provided an accessories drive system, including: a clutch assembly with a drive shaft; and at least one accessory device connected to the drive shaft. In a first position for the clutch assembly: the clutch assembly is arranged to transmit a first torque from a shaft for the transmission to the drive shaft to drive the at least one accessory device and rotation of the drive shaft is isolated from rotation of a crankshaft for the vehicle. In a second position for the clutch assembly: the clutch assembly is arranged to transmit a second torque from the crankshaft to the drive shaft to drive the at least one accessory device and the rotation of the drive shaft is isolated from rotation of the shaft for the transmission.

According to aspects illustrated herein, there is provided an accessories drive system, including: an electric machine; a clutch assembly connectable to a shaft for the transmission and a crankshaft for the vehicle and including a drive shaft; and at least one accessory device connected to the drive shaft. In a first position for the clutch assembly, the clutch assembly is arranged to transmit a first torque from the shaft for the transmission to the drive shaft to drive the at least one accessory device. In a second position for the clutch assembly, the clutch assembly is arranged to transmit a second torque from the crankshaft to the drive shaft to drive the at least one accessory device. In a third position for the clutch assembly, the electric machine is arranged rotate the drive shaft to drive the at least one accessory device.

According to aspects illustrated herein, there is provided an accessories drive system, including: an electric machine; and a clutch assembly including: a drive shaft; a first drive element connectable to a shaft for the transmission; a second drive element connectable to a crankshaft for the vehicle; and a drive hub non-rotatably connected to the drive shaft. The drive system includes at least one accessory device connected to the drive shaft. In a first position for the clutch assembly: the first drive element is arranged to transmit a first torque from the shaft for the transmission to the drive shaft to drive the at least one accessory device; and the drive shaft is rotatable with respect to the second drive element. In a second position for the clutch assembly: the second drive element is arranged to transmit a second torque from the crankshaft to the drive shaft to drive the at least one accessory device; and the drive shaft is rotatable with respect to the first drive element. In a third position for the clutch assembly: the drive shaft is rotatable with respect to the first and second drive elements; and the electric machine is arranged to rotate the drive shaft to drive the at least one accessory device.

According to aspects illustrated herein, there is provided a vehicle, including: an engine; a crankshaft connected to the engine; a torque converter including a cover and an output; a connection element non-rotatably connecting the crankshaft and the cover; a transmission including an output shaft and an input shaft non-rotatably connected to the output of the torque converter; and at least one accessory device. In a first mode of operation for the vehicle, the at least one accessory device is driven by the transmission at a rotational speed of the output shaft and rotation of the drive shaft is isolated from rotation of the crankshaft. In a second mode of operation for the vehicle, the at least one accessory device is driven by the engine at a rotational speed for the crankshaft; and rotation of the drive shaft is isolated from rotation of the output shaft.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1A:
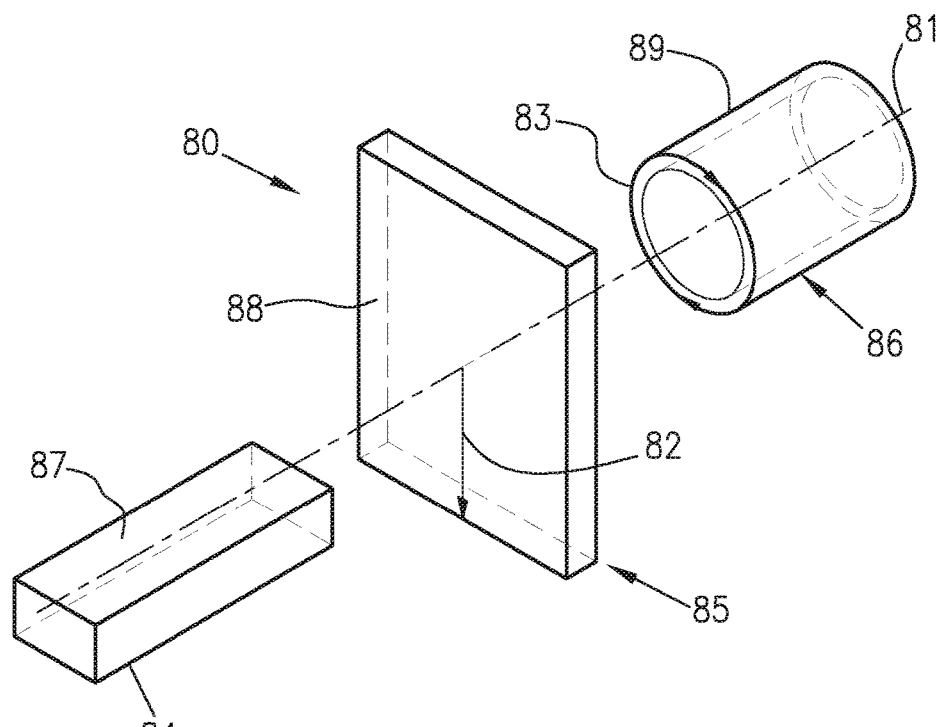
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
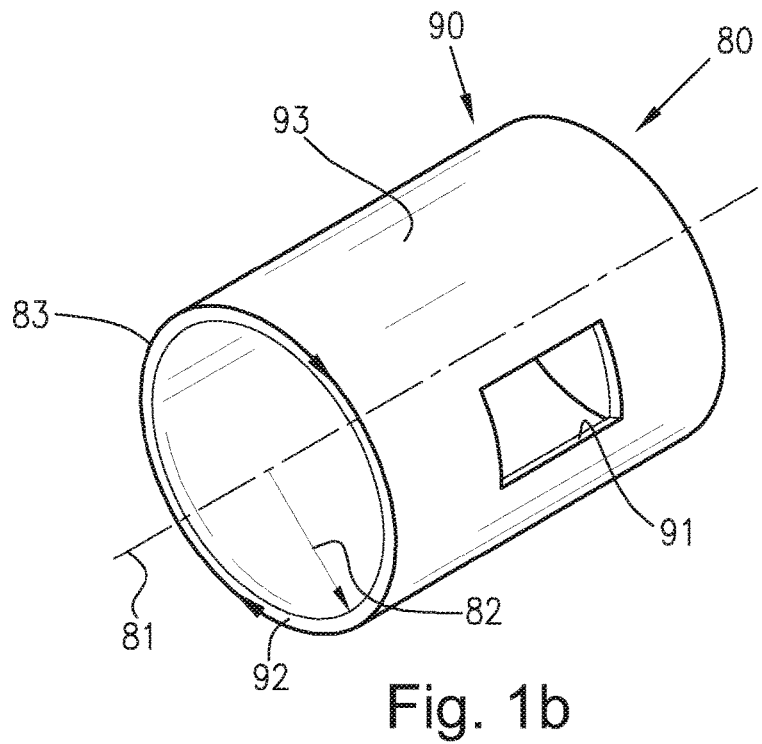
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is a circumferential surface.

Figure 2:
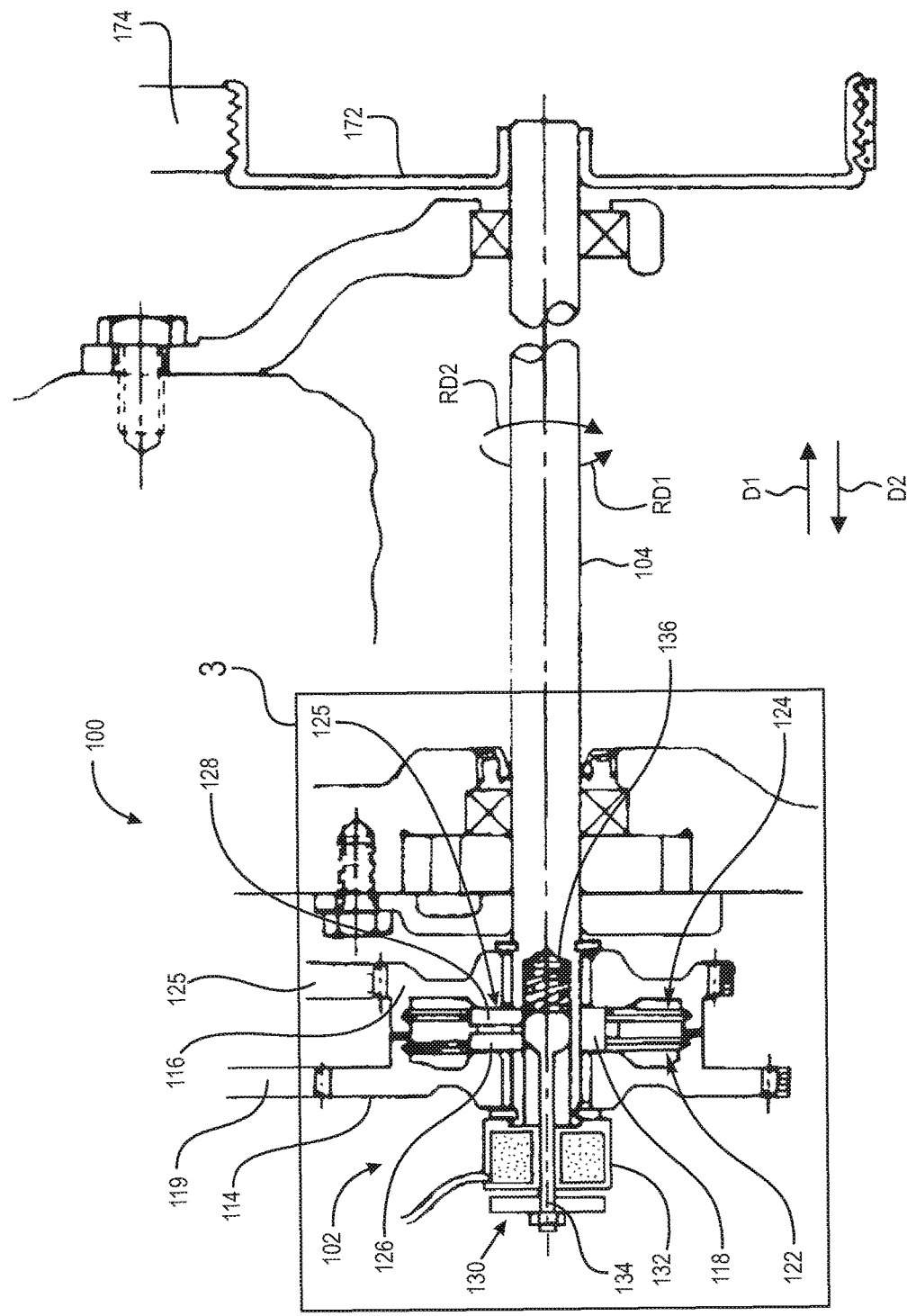
FIG. 2 is a cross-sectional view of an accessories drive system.

FIG. 2 is a cross-sectional view of transmission accessories drive system 100.

Figure 3:
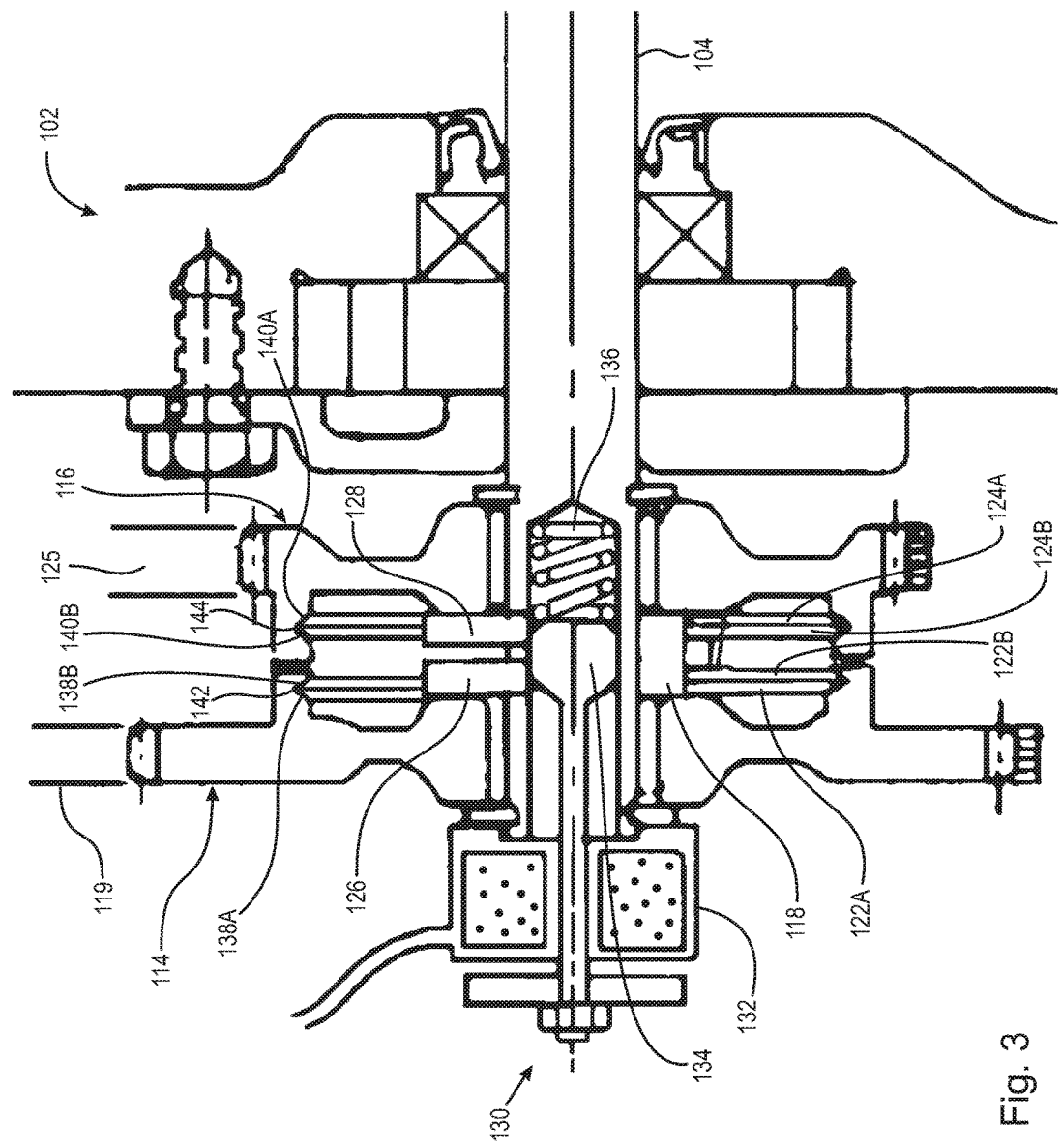
FIG. 3 is an enlarged view of area 3 in FIG. 2.

FIG. 3 is an enlarged view of area 3 in FIG. 2.

Figure 4:
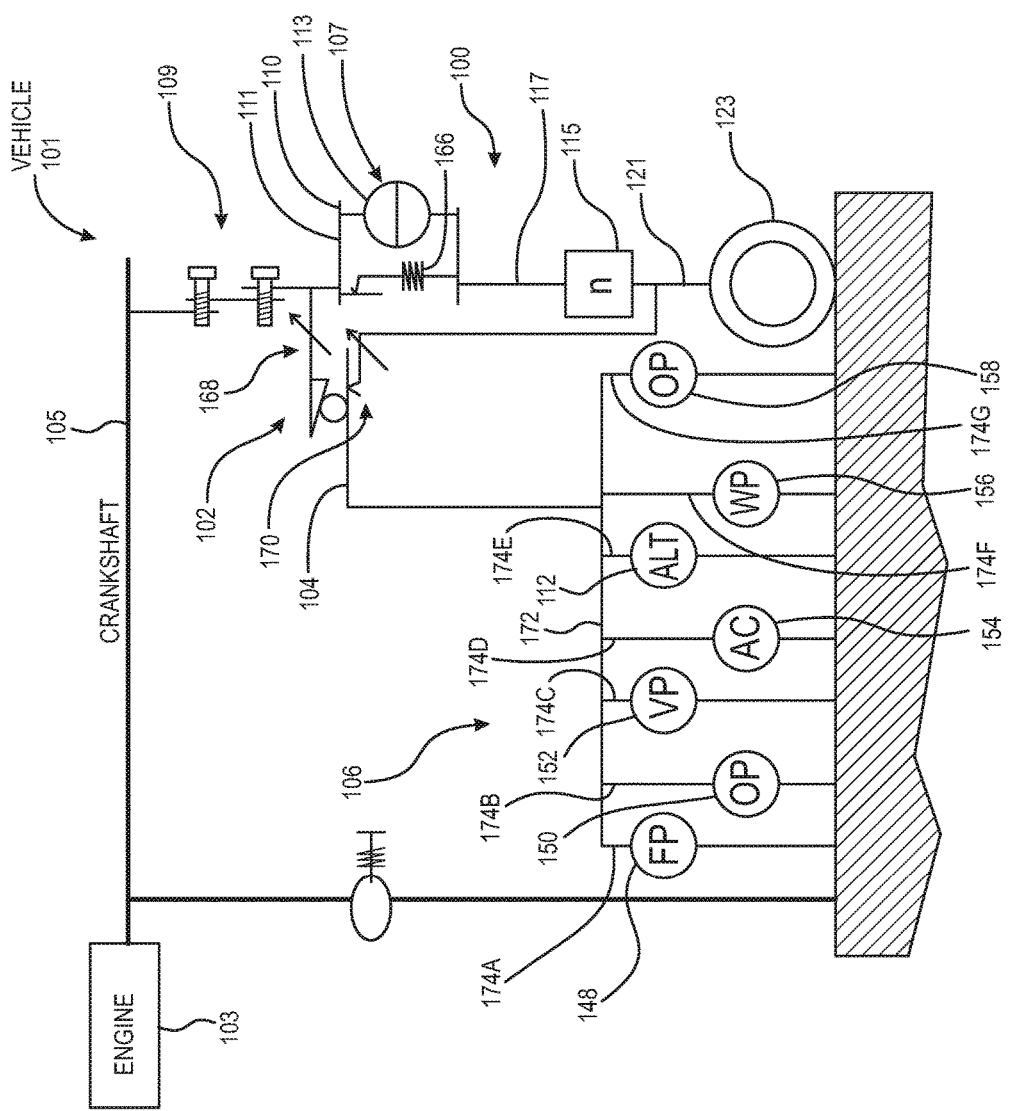
FIG. 4 is a schematic block diagram of a vehicle with an accessories drive system.

FIG. 4 is a schematic block diagram of a vehicle with transmission accessories drive system 100. The following should be viewed in light of FIGS. 2 through 4. In an example embodiment, vehicle 101 includes engine 103, crankshaft 105, and transmission 115 with input shaft 117, output shaft 121 to drive wheels 123, and optional counter shafts, layshafts or concentric shafts. By "transmission" we mean a device for transmitting torque with an input shaft, an output shaft, and gearing for converting a rotational speed of the input shaft to a different speed at the output shaft. Transmission 115 may be a multi-speed planetary automatic transmission, a multi-speed manual gearbox, or a continuously variable transmission, for example. Vehicle 101 includes at least one accessory device 106. In a first mode of operation for the vehicle, the at least one accessory device is driven by the engine at a rotational speed for the crankshaft. In a second mode of operation for the vehicle, the at least one accessory device is driven by the transmission at a rotational speed of one of the shafts of transmission 115.

In an example embodiment, the vehicle includes accessories drive system 100 connected to crankshaft 105 and one of the shafts of the transmission, and including drive shaft 104. The at least one accessory device 106 is connected to the drive shaft. In the first mode of operation for the vehicle, the accessories drive system is arranged to transmit a first torque from one of the shafts of the transmission to the drive shaft to drive the at least one accessory device while rotation of the drive shaft is isolated from rotation of a crankshaft. In the second mode of operation, the accessories drive system is arranged to transmit a second torque from crankshaft 105 to the drive shaft to drive the at least one accessory device while the rotation of the drive shaft is isolated from rotation of the shaft for the transmission.

In an example embodiment, vehicle 101 includes launch device 107 and connection element 109 non-rotatably connecting engine 103 and cover 111 of the launch device. In an example embodiment, launch device 107 is a wet or dry launch clutch or double clutch. In an example embodiment, launch device 107 is a torque converter. The discussion that follows is directed to torque converter 107; however, it should be understood that the discussion is applicable to a launch device in general. Connection element 109 can include a flexplate. In an example embodiment, cover 111 in non-rotatably connected to pump 113 of the torque converter. Input shaft 117 is non-rotatably connected to an input of the torque converter, for example cover 111, and output shaft 121 drives wheels 123. In a first mode of operation for the vehicle, the at least one accessory device is driven by the engine at a rotational speed for the crankshaft. In a second mode of operation for the vehicle, the at least one accessory device is driven by the transmission at a rotational speed of output shaft 121 or one of the transmission counter shafts, layshafts or concentric shafts.

In an example embodiment, the vehicle includes accessories drive system 100 connected to the cover and output shaft 121 and including drive shaft 104. The at least one accessory device 106 is connected to the drive shaft. In the first mode of operation for the vehicle, the accessories drive system is arranged to transmit a first torque from output shaft 121 to the drive shaft to drive the at least one accessory device. In the second mode of operation, the accessories drive system is arranged to transmit a second torque from cover 111 to the drive shaft to drive the at least one accessory device. In general, the portion of the launch device connected to system 100 rotates at the same speed as the crankshaft.

In an example embodiment, accessories drive system 100 includes clutch assembly 102. As further described below, in a first position for the clutch assembly, the clutch assembly is arranged to transmit torque from output shaft 121 for transmission 115 to the drive shaft to drive the accessory device(s). As further described below, in a second position for the clutch assembly, the clutch assembly is arranged to transmit torque from cover 111 of torque converter 107, for example, pump hub 110 of the torque converter, to the drive shaft to drive the accessory device(s). The pump hub is non-rotatably connected to pump 113.

In an example embodiment, assembly 100 includes electric machine 112. In a third position for the clutch assembly, the drive shaft is rotatable with respect to shaft 121 and cover 111 and the electric machine rotates the drive shaft to drive the at least one accessory device. By "electric machine" we mean an electrical device capable of generating electrical current, for example, to charge a battery and/or capable of producing torque, for example an electric motor.

In an example embodiment, the clutch assembly includes drive element 114 arranged to transmit torque from the output shaft. Drive element 114 is connectable to the output shaft, for example via chain or belt 119. In an example embodiment, the clutch assembly includes drive element 116 arranged to transmit torque from cover 111. Drive element 116 is connectable to cover 111, for example via chain or belt 125. In the first position, drive element 114 is arranged to transmit torque from the output shaft to the drive shaft. In the second position, drive element 116 is arranged to transmit torque from the output of the torque converter to the drive shaft.

The clutch assembly includes one-way clutch functionality (for example, clutch 168 described below) and bi-directional clutch functionality (for example, clutch 170 described below). In an example embodiment, in the first position, the clutch assembly and drive element 114 are arranged to prevent rotation of the drive shaft in direction RD1 and direction RD2, opposite direction RD1. In an example embodiment, in the second position, the drive shaft is rotatable in direction RD1 and the clutch assembly and drive element 116 are arranged to prevent rotation of the drive shaft in a direction RD2. Note that directions RD1 and RD2 as shown in the figures can be reversed.

In general, only one of the first or second drive elements or the electric machine drives the drive shaft at any one time. For example, in the first position, drive element 114 is transmitting torque to the drive shaft, the drive shaft is rotatable with respect to drive element 116, and the electric machine is being driven by the drive shaft. For example, in the second position, drive element 116 is transmitting torque to the drive shaft, the drive shaft is rotatable with respect to drive element 114, and the electric machine is being driven by the drive shaft. For example, in the third position, the drive shaft is rotatable with respect to both drive element 114 and drive element 116 and is driven by the electric machine.

In an example embodiment, the clutch assembly includes hub 118, wedge plate pairs 122 and 124, and engagement system 125. In an example embodiment, system 125 includes keys 126 and 128. In an example embodiment, the clutch assembly includes actuator 130 including solenoid 132, selection element 134, and spring 136. In an example embodiment, the spring and portions of the selection element are located radially inside of the drive shaft. Wedge plates pair 122 includes wedge plates 122A and 122B with respective outer circumferences 138A and 138B, respectively, engaged with drive element 114. For example, circumferences 138A and 138B are disposed in groove 142, to restrain wedge plates 122A and 122B in an axial direction, while enabling at least some radial movement as described below. Wedge plates pair 124 includes wedge plates 124A and 124B with respective outer circumferences 140A and 140B, respectively, engaged with drive element 116. For example, circumferences 140A and 140B are disposed in groove 144, to restrain wedge plates 124A and 124B in an axial direction, while enabling at least some radial movement as described below.

In FIGS. 2 and 3, the clutch assembly is in the third clutch position. The selection element is displacing the keys radially outward with respect to the hub such that wedge plate pairs 122 and 124 are non-rotatably connected to the hub. As a result, the wedge plate pairs are rotatable with respect to the drive elements and the drive shaft is rotatable with respect to the drive elements. In an example embodiment, hub 118 includes an outer circumferential surface with a plurality of circumferentially spaced ramps and wedge plate pairs 122 and 124 include respective inner circumferential surfaces with respective pluralities of circumferentially spaced ramps engageable with the ramps of hub 118. When wedge plate pairs 122 and 124 do not rotate with respect to the drive hub, the ramps of hub 118 and the respective ramps of wedge plate pairs 122 and 124 do not rotate with respect to each other and the ramps of hub 118 do not engage with the respective ramps of wedge plate pairs 122 and 124 to radially outwardly expand wedge plate pairs 122 and 124. Thus, wedge plate pairs 122 and 124 rotate with respect to drive elements 114 and 116, respectively.

To attain the first clutch position, the selector element is displaced in direction D1 such that key 126 disengages with wedge plate pair 122, and contact between drive element 112 and wedge plate pair 122 rotates wedge plate pair 122 with respect to the hub to non-rotatably lock drive element 112 and with the hub. That is, the ramps for hub 118 and wedge plate pair 122 slide across each other, pushing wedge plate pair 122 radially outward to non-rotatably connect to drive element 114. Key 128 non-rotatably connects wedge plate 124 and the hub such that the drive shaft is rotatable with respect to drive element 116. That is, as described above, the ramps for hub 118 and wedge plate pair 124 do not rotate with respect to each other and wedge plate pair 124 is not expanded radially outward.

To attain the second clutch position, the selector element is displaced in direction D2 such that key 128 disengages with wedge plate pair 124, and contact between drive element 114 and wedge plate pair 124 rotates wedge plate pair 124 with respect to the hub to non-rotatably lock drive element 114 and with the hub. That is, the ramps for hub 118 and wedge plate pair 124 slide across each other, pushing wedge plate pair 124 radially outward to non-rotatably connect to drive element 116. Key 126 non-rotatably connects wedge plate 122 and the hub such that the drive shaft is rotatable with respect to drive element 114. That is, as described above, the ramps for hub 118 and wedge plate pair 122 do not rotate with respect to each other and wedge plate pair 122 is not expanded radially outward.

It should be understood that the clutch assembly is not limited to the particular components described above, in particular with respect to one-way clutch functionality. For example, components different from the drive elements, keys, wedge plate pairs, and key actuator described above can be used to implement the one-way clutch functionality.

The position of the clutch assembly can be selected to provide a desired drive arrangement for the accessory devices. For example, a particular rotational speed is desired for the drive shaft. The desired speed could be related to minimum power requirements or efficiency of operation of the accessory devices. Drive elements 114 and 116 are rotating at respective speeds. Drive system 100 is configured such that the first or second position for the clutch assembly is selected according to which position best meets the conditions associated with the desired rotational speed for the drive shaft. For example, the rotational speed of drive element 114 is closer to the desired rotational speed than the rotational speed of drive element 116 and the first clutch position is selected, or the rotational speed of drive element 116 is closer to the desired rotational speed than the rotational speed of drive element 114 and the second clutch position is selected.

As another example, the rotational speed of drive element 114 is less than the desired rotational speed, the rotational speed of drive element 116 is greater than the desired speed, and the second clutch position is selected, or the rotational speed of drive element 116 is less than the desired rotational speed, the rotational speed of drive element 114 is greater than the desired speed, and the first clutch position is selected. As a further example, the clutch position associated with the lower of the rotational speeds for drive elements 114 or 116 can be selected. For example, if the rotational speed for element 114 is lower than the rotational speed for element 116, the first clutch position is selected. Note that other criteria can be applied to selecting the first and second clutch positions.

In an example embodiment, drive element 114 is bi-directional. For example, torque can be transmitted from drive element 114 to the drive shaft, as when the vehicle is operating in a steady state mode (for example, cruising at highway speed and not accelerating or decelerating) or a deceleration mode (for example, when wheels are transmitting torque to the transmission). During some operating conditions (for example, launching from a stop light or pulling a trailer up a hill), torque from the electric machine may be transmitted from the drive shaft to drive element 114 to help propel the vehicle.

In an example embodiment, the torque converter includes a turbine, a pump, and a pump hub non-rotatably connected to the pump (not shown) and the torque converter output includes the pump hub.

In an example embodiment, the at least one accessory device includes a plurality of accessory devices. In an example embodiment, the at least one accessory device includes one or more of fuel pump 148, engine oil pump 150, vacuum pump 152, air conditioning compressor 154, water pump 156, or transmission oil pump 158.

The following provides further detail regarding system 100. System 100 includes three-position selectable one-way clutch assembly 102 that connects, for example, a torque converter pump hub and a transmission output shaft to accessory devices 106. For example, the clutch assembly includes respective one-way clutch functionality associated with torque input from the pump hub and from the output shaft. Thus, in the first clutch position, the accessory devices, are driven the speed of engine 103 (connected to the torque converter by crankshaft 105 and connection 109) by cover 111 and in the second clutch position, the accessory devices are driven by output shaft 121, for example when decelerating or when a vehicle housing system 100 is operating at highway speed. In the third clutch position, the accessory devices are disconnected from the drive shaft and are driven by the electric machine, for example, when the vehicle is accelerating or when the engine is shut off.

In an example embodiment, torque converter clutch 166 is connected to cover 111. Drive element 114, wedge plate pair 122, key 126, and hub 118 form one-way clutch 168. Drive element 116, wedge plate pair 124, key 128, and hub 118 form one-way clutch 170. In an example embodiment, drive pulley 172 is non-rotatably connected to drive shaft 104 to drive accessory devices 106. For example, pulley 172 drives one of devices 106 via belt 174. Belts 174A-G are shown in FIG. 4. Alternatively, pulley 172 may drive two or more of devices 106 via a serpentine belt, as is known in the art.

In an example embodiment, drive element 114 is connected to the transmission output shaft by chain or belt 119, creating a ratio of 0.65. In an example embodiment, drive element 116 is connected to cover 111 by chain or belt 125 creating a ratio of 1:1. It should be understood that other ratios are possible.

Figure 5:
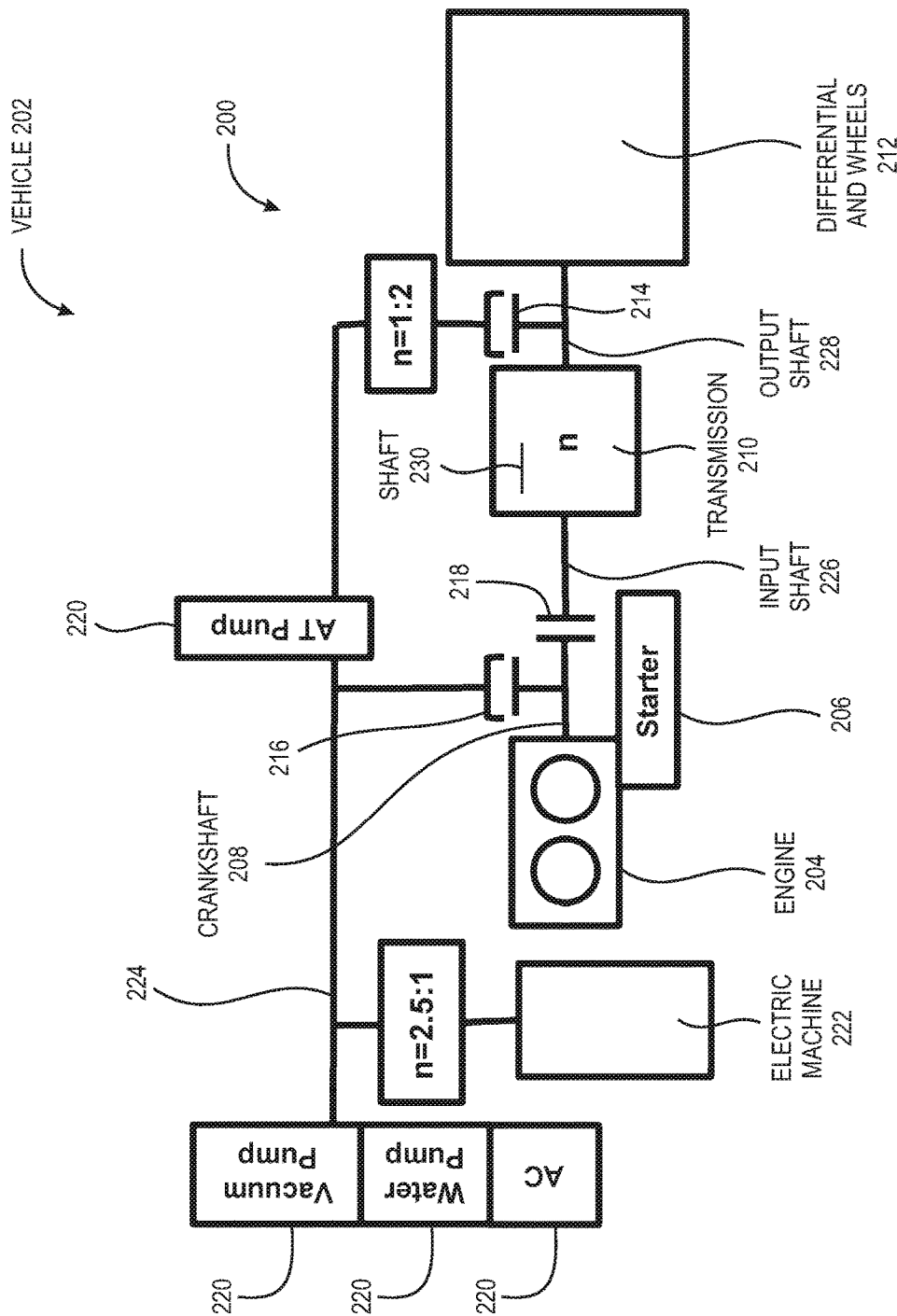
FIG. 5 is a schematic block diagram of a vehicle with an accessories drive system.

FIG. 5 is a schematic block diagram of a vehicle with accessories drive system 200. In an example embodiment, vehicle 202 includes accessories drive system 200, engine 204, starter 206, crankshaft 208, transmission 210, and differential/wheels 212. System 200 includes clutches 214, 216, and 218, at least one accessory device 220, electric machine 222, and drive shaft 224. Clutch 218 is a friction clutch. Clutches 214 and 216 can be dog clutches, friction clutches, or switchable one-way clutches. In an example embodiment, the descriptions of clutches 168 and 170 are applicable to clutches 216 and 214 when clutches 216 and 214 are switchable one-way clutches. The discussion regarding devices 106 is applicable to device(s) 220. Example ratios of 2.5:1 and 1:2 are shown between the electric machine and drive shaft 224 and between clutch 214 and drive shaft 224, respectively; however, it should be understood that other ratios are possible.

The discussion regarding vehicle 101 and system 100 is generally applicable to vehicle 202 and system 200. For example, in the first mode of operation for the vehicle, the at least one accessory device is driven by the engine at a rotational speed for the crankshaft. In a second mode of operation for the vehicle, the at least one accessory device is driven by the transmission at a rotational speed of one of the shafts of transmission 210.

In an example embodiment, accessories drive system 200 is connected to crankshaft 208 and one of the shafts of the transmission, such as input shaft 226, output shaft 228, or counter shaft, layshaft or concentric shaft 230, for example, within the transmission. The at least one accessory device 220 is connected to the drive shaft. In the first mode of operation for the vehicle, the accessories drive system is arranged to transmit a first torque from one of the shafts of the transmission to the drive shaft to drive the at least one accessory device while rotation of the drive shaft is isolated from rotation of a crankshaft. In the second mode of operation, the accessories drive system is arranged to transmit a second torque from crankshaft 208 to the drive shaft to drive the at least one accessory device while the rotation of the drive shaft is isolated from rotation of the shaft for the transmission.

Figure 6:
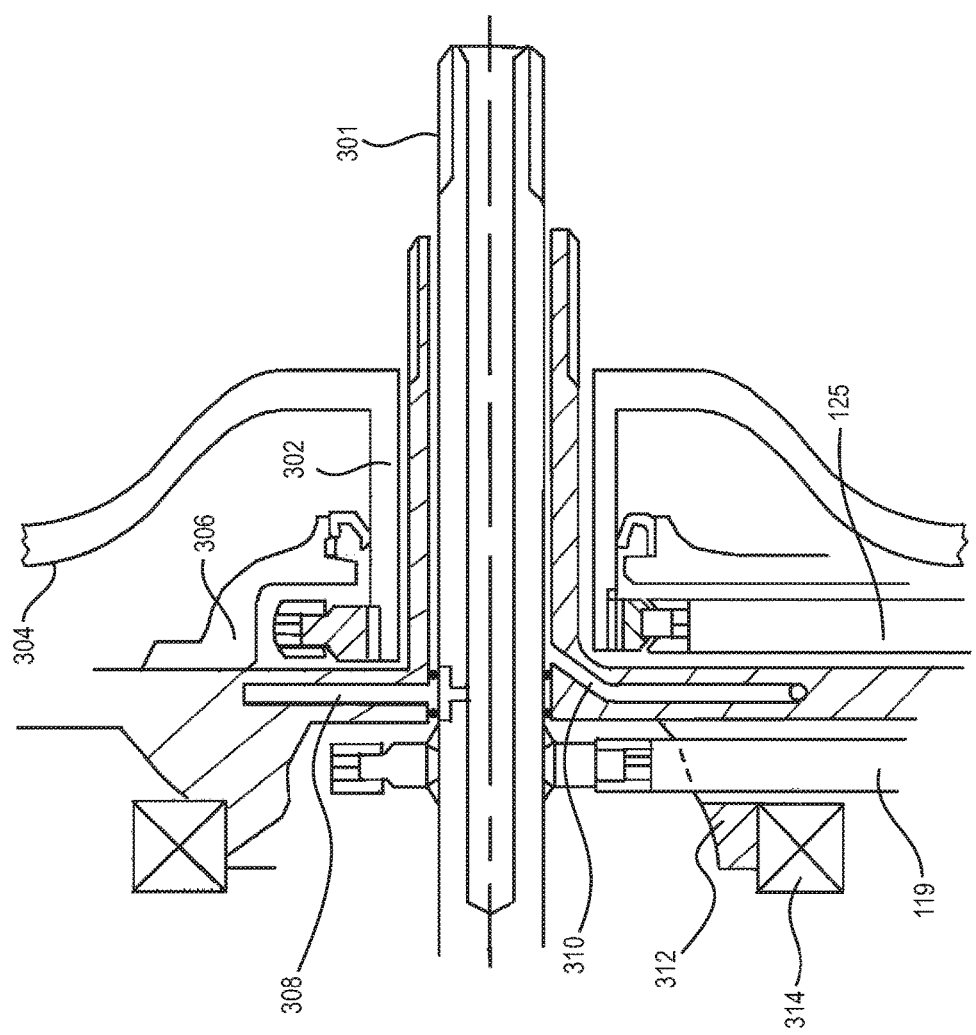
FIG. 6 is a cross-sectional view of a connection to an input shaft of a transmission for an accessories drive system; and, FIG. 7 is a schematic block diagram of a vehicle with an accessories drive system.

FIG. 6 is a cross-sectional view of a connection to an input shaft of a transmission for an accessories drive system.

Figure 7:
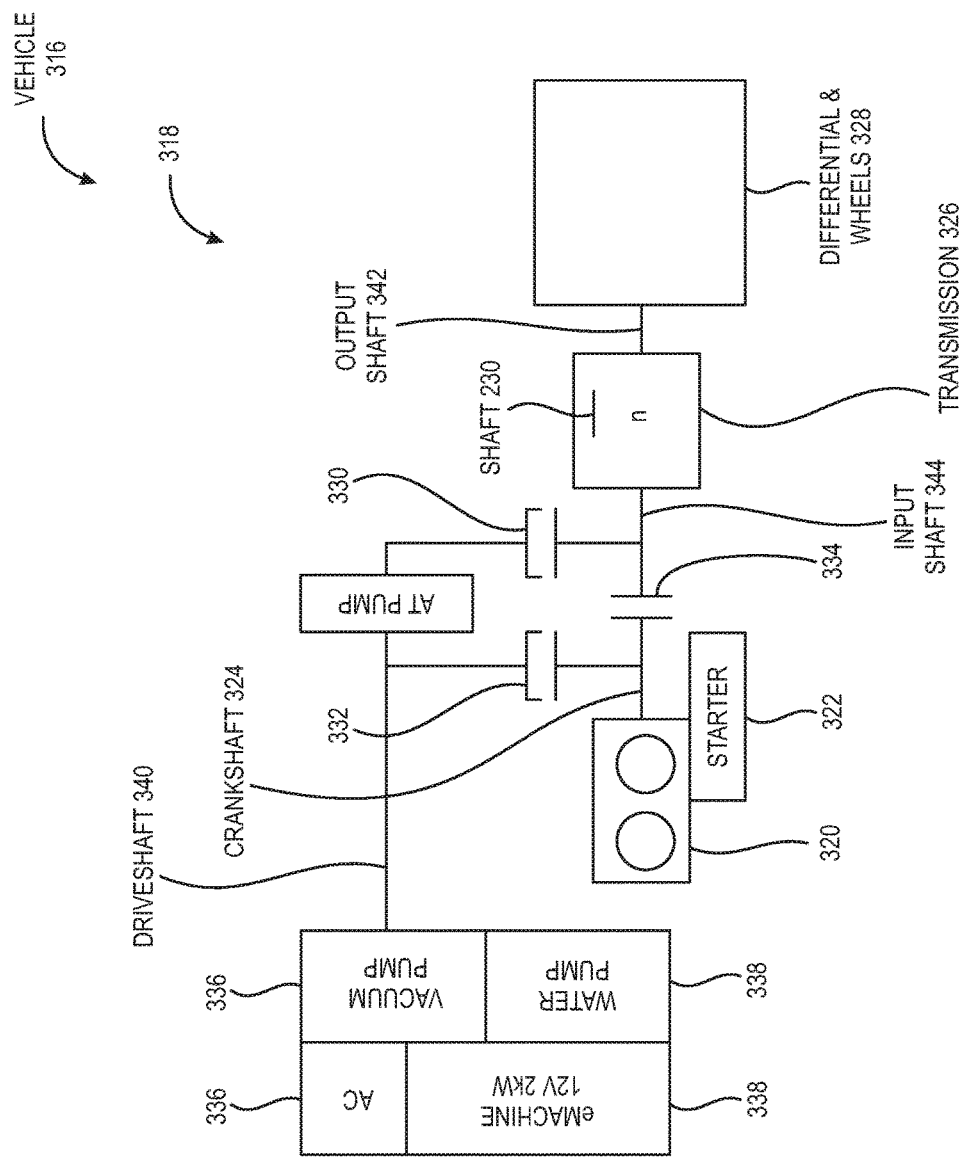

FIG. 7 is a schematic block diagram of a vehicle with accessories drive system 300. FIGS. 6 and 7 illustrate an arrangement to provide torque from input shaft 301 of a transmission. In FIG. 6, chain or belt 125 is connected to pump hub 302 for torque converter 304 (only partially depicted). Chain or belt 125 is contained in housing 306. Passages 308 and 310 are apply and release pressure hydraulic passages for operation of the torque converter. Chain or belt 119 is connected to a sprocket on input shaft 300. Housing 312 supports bearing 314 which supports gears in the transmission (not shown).

In an example embodiment, vehicle 316 includes accessories drive system 318, engine 320, starter 322, crankshaft 324, transmission 326, and differential/wheels 328. System 300 includes clutches 330, 332, and 334, at least one accessory device 336, electric machine 338, and drive shaft 340. Clutch 334 is a friction clutch. Clutches 330 and 332 can be dog clutches, friction clutches, or switchable one-way clutches. In an example embodiment, the descriptions of clutches 168 and 170 are applicable to clutches 332 and 330 when clutches 332 and 330 are switchable one-way clutches. The discussion regarding devices 106 is applicable to device(s) 336.

Using chain or belt 119 and the connection to the input shaft of the transmission, when the vehicle is coasting to a stop, all the speeds of the transmission can be used to drive the accessories. For example, there is a fixed ratio between differential and wheels 328 and output shaft 342. During coasting the rotational speed of the output shaft falls below minimum accessory drive speed very quickly as the wheels decelerate, such that accessory devices 336 cannot be driven by the output shaft. However, in coast, input shaft 344 rotates at a speed determined by gears engaged in transmission 326. Therefore, all the gear ratios in transmission 326 are available to control the rotational speed of the input shaft. Thus, in coast, when the rotation of the output shaft is too low, the transmission can be shifted to increase the rotational speed of the input shaft such that the rotational speed of the input shaft is adequate to drive the accessory devices.

In an example embodiment (not shown), a one-way clutch is present between a turbine for torque converter 304 and input shaft 344. The one-way clutch enables the turbine to drive the vehicle but not to back-drive the engine in coast. This would enable all kinetic energy to go into the accessory devices.

The following provides further detail regarding vehicles 101/202/302 and systems 100/200/300. Although the following discussion is directed to vehicle 101 and system 100, it should be understood that the discussion is applicable to vehicle 202/302 and system 200/300 as well. In an example embodiment, the accessory devices associated with operation of the engine, such as the water pump and air conditioner compressor, are located in an engine compartment. In an example embodiment, the accessory devices associated with operation of the engine, such as the water pump and air conditioner compressor, are located at or in the transmission.

In an example embodiment, transmission oil pump 158 is moved off-axis, for example, not directly driven by a torque converter pump hub, and connected through the clutch assembly, which advantageously enables use of a smaller pump providing full transmission pressure during sailing (engine off highway cruising). In an example embodiment, engine oil pump 150 is connected to system 100 to advantageously pressurize an oil system for the vehicle with the engine off, for example, to adjust a hydraulic vane-type variable cam timing (VCT) system for startup.

Thus, system 100 enables accessory devices to be driven at lower speeds during normal operation of the vehicle and to be driven while the engine is off. Further, system 100 enables accessory devices to be driven by the electric machine when the engine is off or when the vehicle is accelerating. System 100 also enables the vehicle to be hybridized by enabling use of a larger capacity electric machine and battery system in a conventional vehicle. Thus, system 100 enables multiple levels of hybridization by enabling increased sizing of the electric machine and battery. As a result, system 100 enables a modular hybrid strategy with one base power train.

System 100 provides several advantages for modern vehicle drivetrains. The system is an enabler for stop-start strategies in which the vehicle engine is turned off while approaching or waiting at a traffic light, for example. Because system 100 allows the electric machine to drive accessories with the engine off (i.e., the third clutch position), the cabin stays comfortable because the air conditioner is still functional, the engine oil pump can pressurize the variable cam timing system for optimum restart, and the engine will restart faster because the inertia of the accessory drive is removed.

The system also solves problems with turning the engine off when the vehicle is cruising on a highway, sometimes referred to as sailing. An output shaft driven transmission oil pump (i.e., the first clutch position) enables full hydraulic clutch control, including gear shifts, in the transmission, and a driven vacuum pump ensures vacuum boosted brakes remain operational for safety. In addition, downspeeding the accessories through chain or belt ratios and/or connection to the transmission output shaft reduces drag on the drivetrain. The same output shaft connection allows kinetic energy recovery to recharge the battery and drive the aforementioned accessories without using engine or battery power during deceleration.

The system also includes one-way clutch functionality when the engine is driving the accessories (i.e., the second clutch position). The one-way clutch decouples the accessory devices from engine vibration, since the one-way clutch function only transmits engine torque in one rotational direction. Thus, the slowing of the crankshaft between cylinder firings, which can create vibration and reduce operational efficiency, is not transmitted to the drive shaft. For example, in response to the slowing, drive element 116 free wheels rather than transmitting torque to the drive shaft.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A transmission accessories drive system for a vehicle having a shaft for a transmission, a crankshaft, and a drive shaft, comprising:
    at least one accessory device connected to the drive shaft;
    a clutch assembly connectable to the shaft for the transmission and the crankshaft and including the drive shaft,
        arranged to transmit a first torque from the shaft for the transmission to the drive shaft to drive the at least one accessory device in a first position, and
        arranged to transmit a second torque from the crankshaft to the drive shaft to drive the at least one accessory device in a second position; and,
    an electric machine arranged to drive the at least one accessory device when the clutch assembly is in a third position.

2. The transmission accessories drive system of claim 1, wherein the clutch assembly comprises:
    a first drive element connectable to the shaft for the transmission;
    a second drive element connectable to the crankshaft; and,
    a drive hub non-rotatably connected to the drive shaft.

3. The transmission accessories drive system of claim 2, wherein the first drive element is arranged to transmit the first torque from the shaft for the transmission to the drive shaft to drive the at least one accessory device and the drive shaft is rotatable with respect to the second drive element in the first position.

4. The transmission accessories drive system of claim 2, wherein the second drive element is arranged to transmit the second torque from the crankshaft to the drive shaft to drive the at least one accessory device and the drive shaft is rotatable with respect to the first drive element in the second position.

5. The transmission accessories drive system of claim 2, wherein the drive shaft is rotatable with respect to the first and second drive elements and the electric machine is arranged to drive the at least one accessory device in the third position.

6. The transmission accessories drive system of claim 1, wherein the crankshaft is connected to an engine.

* * * * *